May 13, 1930.   F. JEHLE ET AL   1,758,444

PISTON

Filed March 17, 1922   2 Sheets-Sheet 1

INVENTORS.
FERDINAND JEHLE &
FRANK JARDINE
BY. B. D. Watts
ATTORNEY.

May 13, 1930.   F. JEHLE ET AL   1,758,444
PISTON
Filed March 17, 1922   2 Sheets-Sheet 2
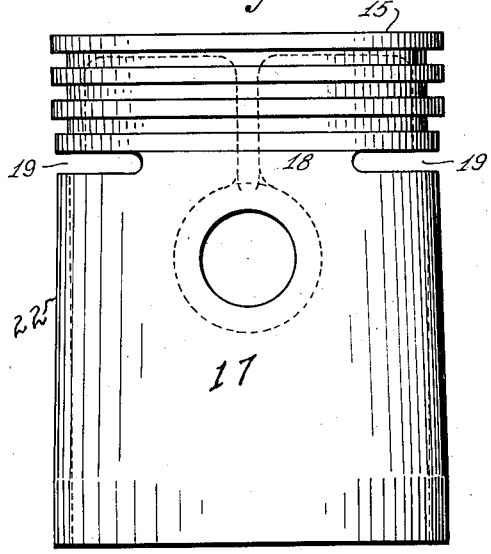
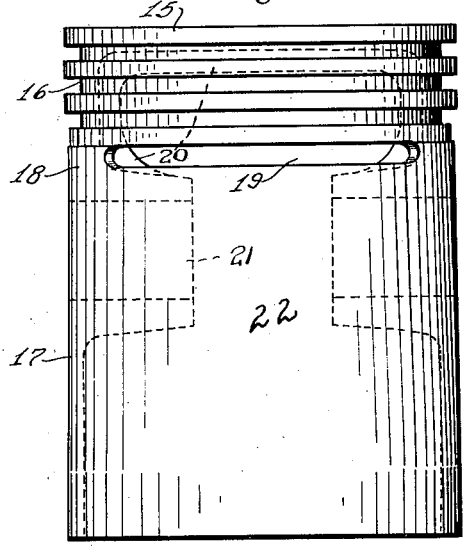
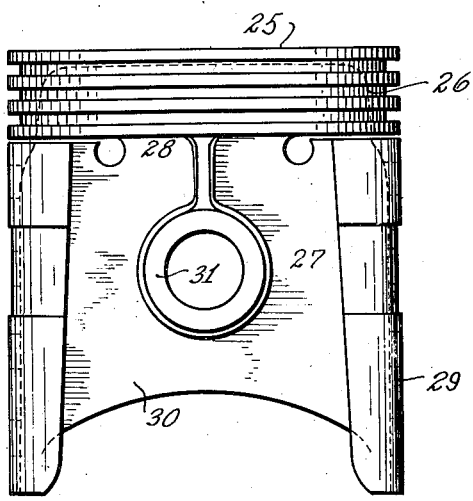
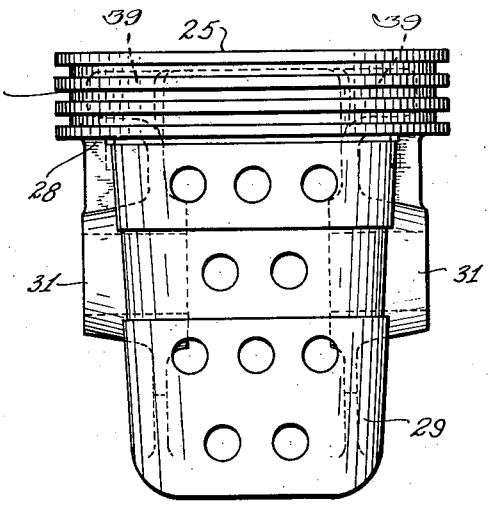
INVENTORS.
FERDINAND JEHLE &
FRANK JARDINE.
BY B.D.Watts
ATTORNEY Patented May 13, 1930

1,758,444

UNITED STATES PATENT OFFICE

FERDINAND JEHLE, OF CLEVELAND, OHIO, AND FRANK JARDINE, OF DETROIT, MICHIGAN, ASSIGNORS, BY MESNE ASSIGNMENTS, TO THE CLEVELAND TRUST COMPANY, OF CLEVELAND, OHIO, A CORPORATION OF OHIO, AS TRUSTEE

PISTON

Application filed March 17, 1922. Serial No. 544,487.

This invention relates to pistons for internal combustion engines, particularly pistons composed of metals having relatively high coefficients of expansion as compared with iron.

The chief object of the invention is to provide a piston, the thrust face portions of which are adapted to become substantially cylindrical when the piston is heated to its maximum operating temperature.

In the drawings attached to and forming a part hereof:

Figure 1:
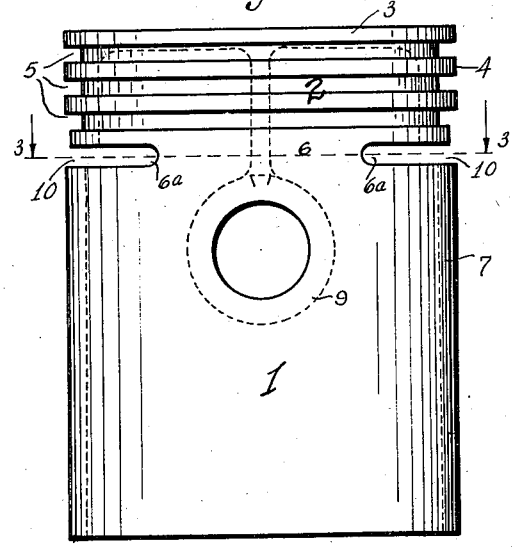
Figs. 1 and 2 are side elevations of a piston constructed in accordance with our invention taken respectively, in line with and at right angles to, the bosses.
Figure 2:
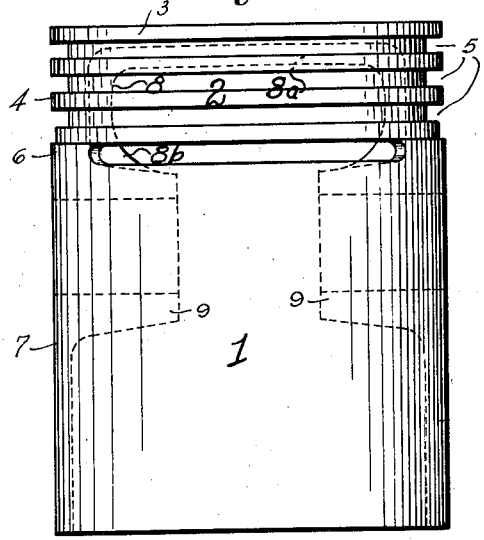
Figure 3:
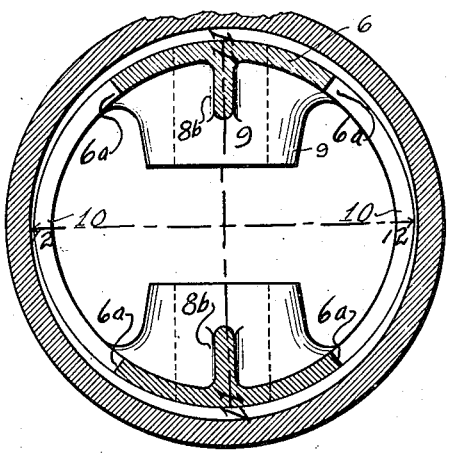
Figs. 3 and 4 are transverse cross sections taken thru the cylinder and piston of an engine fitted with pistons constructed in accordance with our invention, showing respectively in exaggeration the shape of the piston skirt when cold and when heated to operating temperatures.
Figure 4:
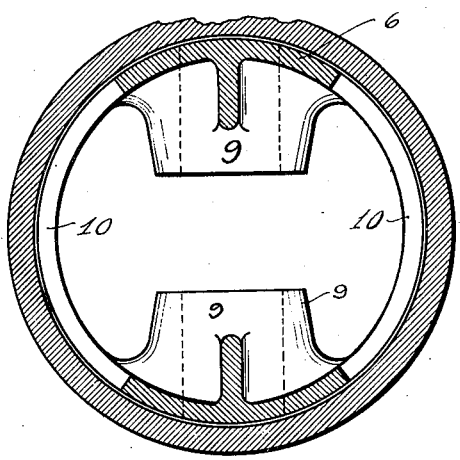

Figs. 5 and 6, and 7 and 8 are views similar to Figs. 1 and 2 of modified forms of pistons.

Referring to Figures 1, 2, 3 and 4, 1 indicates a trunk type piston for an internal combustion engine. The head 2 of the piston consists of a circular disc 3 having a flange 4 depending from the periphery thereof, which flange is provided with suitable grooves 5 on its outer face to receive packing rings (not shown). On opposite sides of the head, connectors 6 integral with the head and, preferably, although not necessarily, integral with the flange 4 extend outwardly from the head and serve to connect the skirt 7 of the piston to the head 2. These connectors 6 are preferably of relatively short circumferential length as compared with the circumferential length of the skirt and may be of various thicknesses but are preferably reinforced by a rib 8, or other suitable means, which rib may extend diametrically across the disc 3 as at 8$^a$ and longitudinally of the connectors 6 to the bosses 9, as at 8$^b$, or even beyond the bosses. This reinforcing means or rib is conveniently formed integrally with the disc, flanges, connectors, skirt and bosses and when so formed, serves to make the connectors, and head function as a substantially rigid structure. The skirt 7 of piston 1 is separated from flange 4 by air gaps 10 except where connectors 6 join the two members.

In transverse cross section the outer surface of the skirt 7 is substantially elliptical with the minor axis 11 passing thru the bosses and the major axis 12 passing thru the bearing or thrust faces at right angles to the middle of the minor axis. The length of the major axis or, in other words, the maximum diameter of the bearing faces, is preferably approximately the same as that of the cylinder in which the piston is to reciprocate, that is .001" to .005" or more, less than the diameter of the cylinder depending upon its diameter. From the ends of the major axis 12 the diameters across the bearing faces progressively decrease toward the minor axis reaching a minimum at the longitudinal edges of the bearing surfaces, or at edges 6$^a$ of connectors 6 in case the bearing surfaces extend thereto. These diameters are preferably of such length when the piston is cold that they will become approximately equal to the diameter of the cylinder when the piston is heated to operating temperature.

The diameters of the piston adjacent the bosses and minor axis and between the adjacent edges of the bearing faces may vary in length provided that when the piston is heated to operating temperature they do not tend to exceed the diameter of the cylinder. In the modification shown in Figs. 1 to 4 the minor axis is such that the piston skirt bears on the cylinder thruout substantially its entire circumferential length when heated to operating temperatures. For example in a 3 inch piston the diameter on the major axis may be 2.997 inches, and at 6$^a$, Fig. 3, or the adjacent edge of the bearing face it may be 2.99 inches.

The action of our improved piston is believed to be about as follows:

When the piston is inserted in the cylinder the clearance between the bearing faces and the cylinder walls at the ends of the major axis is slight, preferably not more than .001" per diameter inch of the piston. By reason of the substantially elliptical curvature of the outer surface of the skirt, the bearing walls of the skirt will have only a line or very narrow contact with the cylinder walls at the ends of the major axis throughout the length of the skirt. As the piston is heated to operating temperatures, the skirt will tend to expand radially in all directions. However, since the skirt does not become highly heated its increase in diameter will not be great, possibly not more than .001" per diameter inch of the piston. When the temperature of the head increases, the head like the skirt, tends to expand radially, equally in all directions. The portions of the skirt which are integrally and rigidly secured to the head are carried outwardly along the minor axis as the head expands, while the portions of the skirt which are separated from the head may move inwardly coincident therewith. The extent of this distortion is not known definitely but the resultant of the expansions of the skirt along the major axis due to increased temperature and the distortion along the minor axis due to the expansion of the head may be a very slight increase in the length of the major axis. As the piston is heated to operating temperatures and the skirt is thus distorted, the bearing surfaces of the piston which are in substantial contact with the cylinder walls increase in circumferential length in each direction from the ends of the major axis directly in proportion to the temperature of the piston and reach a maximum, which may even be the entire circumference of the skirt, when the piston is at its maximum temperature. It is to be noted that in this manner the area of the bearing surface of the piston in substantial engagement with the cylinder walls increases or decreases with the temperature of the piston.

A modified form of piston embodying our invention is shown in Figs. 5 and 6. It consists of a head disc 15, a depending ring flange 16 and a skirt 17 connected to the head by connectors 18. A gap 19 separates opposite portions of the skirt from the head. A rib 20 may be formed across the head and to the bosses 21 in the skirt. In transverse cross section the bearing surfaces 22 of the skirt are substantially elliptical with the major axis at right angles to the minor axis which passes thru the bosses. In addition to being substantially elliptical, the skirt tapers from the end adjacent the head to a point beyond the bosses, preferably leaving a portion at the open end of the skirt which is not tapered. Such a skirt may be said to be, for part of its length, a truncated substantially elliptical cone and for the remainder of its length a substantially elliptical cylinder.

The operation of this form of piston is similar to that of the form described above, except that as the piston becomes heated the effective bearing area increases circumferentially and also longitudinally of the piston toward the head. This is due to the taper of the skirt which permits more clearance at the end of the bearing faces near the head when the piston is cold.

In Figs. 7 and 8 another modified form of piston embodying our invention is shown. 25 indicates the head disc, 26 the ring flange, 27 the skirt and 28 the connectors for joining the head and skirt. While in the first modifications the skirt was of the trunk type, that is substantially cylindrical, in this type the bearing face portions 29 are supported by cross webs 39 which may carry bosses 31. The surfaces of these portions are substantially elliptical having their maximum diameter along their longitudinal middle. Preferably no part of the skirt except the bearing surfaces may contact with the cylinder walls.

Although we have described several embodiments of our invention, we do not wish to be limited thereto since other structures could be devised which would still fall within the scope of our invention.

The scope of our invention is defined by what is claimed.

What is claimed is:

1. A piston for an internal combustion engine comprising a head section consisting of a circular disc and a cylindrical flange depending from the periphery thereof, and a skirt section connected to the flange by diametrically opposite connectors of relatively short circumferential length, wrist pin bosses carried by the skirt adjacent the said connectors, the skirt having its minimum outside diameter along the line of the wrist pin bosses and its maximum outside diameter at right angles to the line of the bosses with the diameters of the intervening skirt portions decreasing in length successively from the maximum diameter toward the minimum diameter.

2. A piston for an internal combustion engine comprising a head consisting of a circular disc and a cylindrical flange depending from the periphery thereof, a skirt connected to the head and having bearing walls separated from the flange of the head section diametrically opposite wrist pin bosses in the skirt, the skirt being substantially elliptical with the maximum outside diameter located at right angles to a line joining the bosses.

3. A piston for an internal combustion engine comprising a head consisting of a circular disc and a cylindrical flange depending from the periphery thereof, a skirt connected to the head and having bearing walls separated from the flange of the head section, diametrically opposite wrist pin bosses in the skirt, the outside surface of the skirt being substantially elliptical with the maximum outside diameter located along a line midway between the bosses and perpendicular to a line joining the bosses.

4. A piston for an internal combustion engine comprising a head consisting of a disc and a ring flange depending from the periphery thereof, a substantially elliptical skirt connected to the head at opposite points adjacent the ends of the minor axis and separated from the head adjacent the ends of the major axis, the major axis being substantially equal in length to the diameter of the cylinder and the minor axis being shorter than the diameter of the piston by an amount no greater than the increase in diameter of the skirt along the minor axis when the piston head is heated from its ordinary non-operating temperature to its maximum operating temperature.

5. A piston for an internal combustion engine comprising a head consisting of a disc and ring flange depending from the periphery thereof, a substantially elliptical skirt connected to the flange by narrow connectors at opposite points adjacent the ends of the minor axis, and separated from the head adjacent the ends of the major axis, the major axis being substantially equal in length to the diameter of the cylinder and the length of the minor axis when the piston is at its ordinary non-operating temperature being such that it may become substantially equal to the major axis when the piston is at its maximum operating temperature.

6. A piston for an internal combustion engine comprising a head having a disc with a flange depending from the periphery thereof, an annular skirt secured to the said flange by diametrically opposite connectors of relative short circumferential length and separated from other parts of the flange, wrist pin bosses in the skirt adjacent the connectors, the bearing faces of the said skirt being substantially elliptical in transverse cross section at ordinary temperatures with the minor axis passing through the said bosses, and adapted to become substantially circular when heated to operating temperatures.

7. A piston for an internal combustion engine comprising a head having a disc and a flange depending from the periphery thereof, an annular skirt secured to the said head by diametrically opposite connectors of relatively short circumferential length as compared with the circumference of the skirt, wrist pins in the skirt adjacent the connectors, the said skirt being substantially elliptical in transverse cross section at ordinary temperatures and having substantially the same diameter on its major axis throughout the entire longitudinal length thereof, the skirt being adapted to become substantially circular in transverse cross section throughout its entire longitudinal length when the piston is heated to operating temperatures.

8. A piston for an internal combustion engine comprising a head having a disc and a flange depending from the periphery thereof, a skirt secured to the head at diametrically opposite points by connectors of relatively short circumferential length as compared with the circumferential length of the skirt, wrist pin bosses in the skirt adjacent the connectors, a rib extending across and integral with the disc, the connectors and bosses, the skirt being substantially elliptical in transverse cross section whereby when the piston is at ordinary non-operating temperatures the cylinder engaging bearing surfaces will be narrow and will lie adjacent the ends of the major axis, the skirt being adapted to be altered in transverse cross section by the expansion of the head in a manner to increase the circumferential length of the cylinder engaging bearing surfaces in direct proportion to the expansion of the head while preventing a substantial increase in the diameter of the skirt along the major axis.

9. A piston for an internal combustion engine comprising a head having a ring flange, a skirt, and connectors joining the head and skirt at opposite points, the said skirt being substantially elliptical in transverse cross section and having a greater diameter at the open end thereof than at the end adjacent the head.

10. In a piston for an internal combustion engine, the combination of a head and a skirt, said skirt being provided with bearing faces formed upon substantially elliptical arcs horizontally, said bearing faces and said head being separated by circumferentially extending slots adjacent the head and piston pin bosses in said skirt located diametrically opposite each other and substantially at right angles to a line joining the centers of the bearing faces, the axis of the skirt through the piston pin bearings being less than the axis connecting the bearing faces.

11. In a piston for an internal combustion engine, the combination of a head and skirt, said skirt being provided with bearing faces having elliptically shaped surfaces, circumferentially extending air gaps in the piston one above each bearing face, wrist pin bosses in the piston located diametrically opposite each other and having axes substantially perpendicular to an axis connecting the bearing faces, the axes of the skirt through the bosses being less than the axis pendicular thereto.

12. In a piston for an internal combustion engine, the combination of a head and skirt, said skirt being provided with bearing faces having elliptically shaped surfaces, circumferentially extending air gaps in the piston one above each bearing face, wrist pin bosses in the piston located diametrically opposite from each other and having axes substantially perpendicular to an axis connecting the bearing faces, the axes of the skirt through the bosses being less than the axis perpendicular thereto, the diameter of the skirt between the centers of the bearing faces adjacent the head being less than the corresponding diameter of the skirt adjacent the open end of the piston.

13. A piston consisting of a unitary structure comprising a disk head and a depending wall including a flange and a skirt, diametrically opposed piston pin bosses within said skirt, a diametrically disposed internal rib joining and reinforcing the bottom of said head and the upper side of said bosses, said skirt being of approximately elliptical transverse cross section having its major diameter perpendicular to the axial line of said bosses, and opposed horizontal slots through said wall parallel to said axial line and in a plane thereabove.

In testimony whereof, we hereunto affix our signatures.

FERDINAND JEHLE.
FRANK JARDINE.